United States Patent [19]

Iwashita

[11] Patent Number: 5,734,242
[45] Date of Patent: Mar. 31, 1998

[54] FORCE CONTROL METHOD BASED ON DISTURBANCE LOAD ESTIMATION

[75] Inventor: Yasusuke Iwashita, Oshino-mura, Japan

[73] Assignee: Fanuc Ltd., Yamanashi, Japan

[21] Appl. No.: 347,301

[22] PCT Filed: Apr. 1, 1994

[86] PCT No.: PCT/JP94/00547

§ 371 Date: Dec. 1, 1994

§ 102(e) Date: Dec. 1, 1994

[87] PCT Pub. No.: WO94/24621

PCT Pub. Date: Oct. 27, 1994

[30] Foreign Application Priority Data

Sep. 29, 1903 [JP] Japan ................................. 5-255266
Apr. 2, 1993 [JP] Japan ................................. 5-098414

[51] Int. Cl.⁶ ................................................. G05B 1/01
[52] U.S. Cl. ........................... 318/434; 318/601; 318/632
[58] Field of Search ................................. 364/148, 149,
364/150, 151; 318/432, 433, 601, 632,
603, 609, 606, 649, 608, 607, 434

[56] References Cited

U.S. PATENT DOCUMENTS

| 4,555,757 | 11/1985 | Dorman | 318/632 |
| 4,864,209 | 9/1989 | Seki et al. | 318/603 |
| 4,993,715 | 2/1991 | Nakamura et al. | 318/649 |
| 5,101,145 | 3/1992 | Rehm | 318/432 |
| 5,374,684 | 12/1994 | Koren et al. | 318/632 |

FOREIGN PATENT DOCUMENTS

| 3-110606 | 5/1991 | Japan . |
| 4-355687 | 12/1992 | Japan . |

*Primary Examiner*—John W. Cabeca
*Attorney, Agent, or Firm*—Staas & Halsey

[57] ABSTRACT

A disturbance estimation observer estimates a disturbance load torque applied to a motor. The estimated disturbance load torque is fed back so that the feedback control is carried out by making the torque corresponds to a commanded force value which is a target value. According to the feedback control, the estimated disturbance load torque is controlled to correspond to the target value, and when the estimated disturbance load torque approximates to an actual load torque, the actual load torque is controlled to the target value. Thus, force control by the motor can readily be carried out on the basis of the disturbance load estimated without using force sensors.

4 Claims, 4 Drawing Sheets

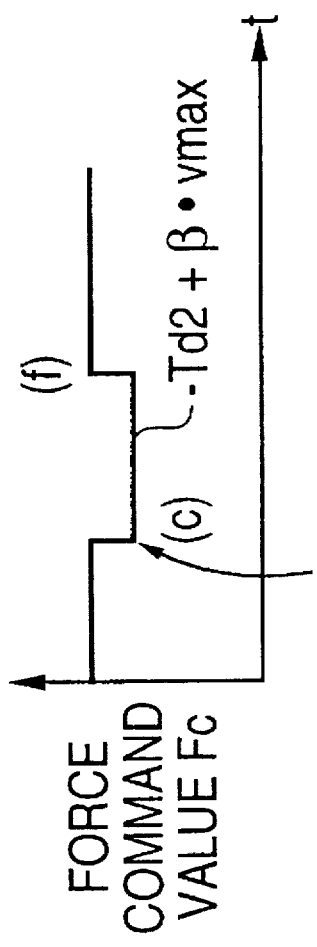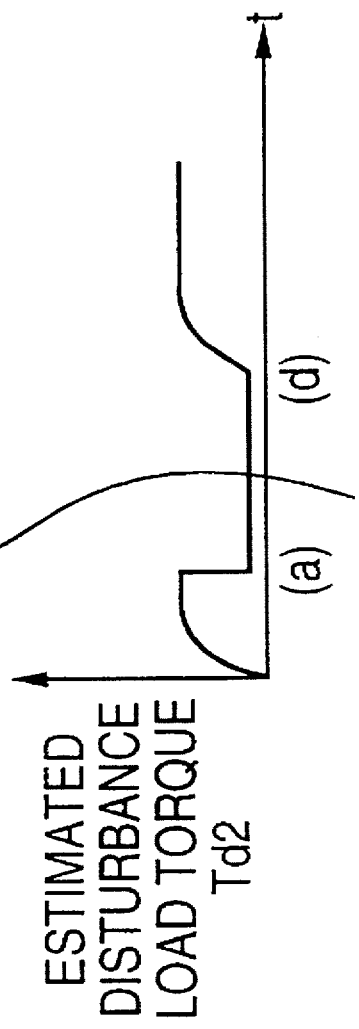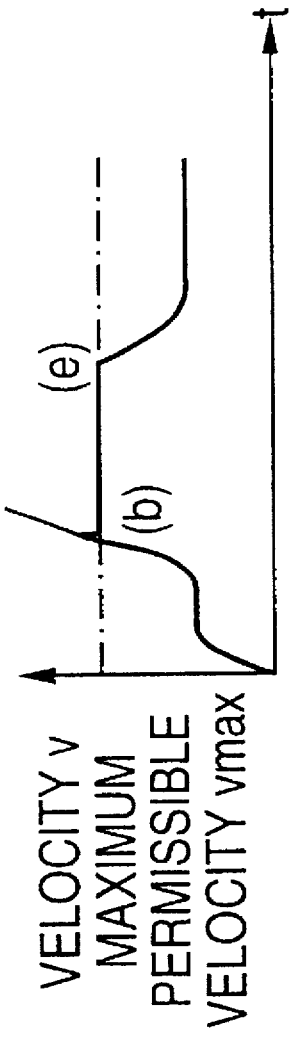
FIG. 5(A)  FORCE COMMAND VALUE Fc
FIG. 5(B)  ESTIMATED DISTURBANCE LOAD TORQUE Td2
FIG. 5(C)  VELOCITY v MAXIMUM PERMISSIBLE VELOCITY vmax

FORCE CONTROL METHOD BASED ON DISTURBANCE LOAD ESTIMATION

FIELD OF THE INVENTION

The present invention relates to a force control method which applies force to a controlled system, and controls the applied force, in machine tools, robots and industrial machines.

DESCRIPTION OF THE RELATED ART

In industrial machines, when employing force control, which not only applies force to a controlled system but also controls the applied force, it has conventionally been a common practice to hydraulically control the force applied to the controlled system by oil pressure of a hydraulic cylinder. In the case of a deburring robot for removing a burr with a robot, the force for pressing the deburring tool mounted on the distal end of the tool's wrist against the work is controlled during the deburring operation. In such a deburring robot, a drive source for driving various axes such as robot's arms and the like comprises a hydraulic cylinder, a servo motor and the like. In the case where the drive source comprises the servo motor, a force sensor is used for executing the aforesaid force control. More specifically, the force sensor is mounted on a distal end portion of a machine against which the controlled system is pressed, and the force detected by the sensor is fed back so that a detected value is controlled to agree with a target value.

In the case where force feedback control is carried out using a force sensor, the stability and reliability of the force control depend on the stability and reliability of the used force sensor. Thus, the higher the stability and accuracy of the used sensor, the higher the accuracy of the available force control. In general, however, the reliability of the force sensor is low as compared with that of a position detector used in conventional servo motor control, and the accuracy of force control is also low as compared with that of position/velocity control. Further, the force sensor is too expensive to be used in low-priced devices. Furthermore, there is a problem that the installation of the force sensor is difficult. In the case where force control is to be carried out with a motor, the use of force sensor is indispensable; however, the use of the force sensor causes the above-mentioned problems. This, therefore, necessitates the use of a hydraulic cylinder. These problems are the factors that have prevented the change of the drive source from the hydraulic drive source to electric drive source.

SUMMARY OF THE INVENTION

An object of the present invention is to easily execute force control with a motor, but without using a force sensor. Another object of the present invention is to provide force control of the motor according to disturbance load estimated.

In a method according to the present invention, a disturbance load torque applied to a motor is estimated by a disturbance estimation observer, and the estimated disturbance load torque is fed back to effect feedback control, by making the estimated disturbance load torque correspond to a force command value which is a target value. Therefore, the estimated disturbance load torque is controlled so as to correspond to the target value. Further, when the estimated disturbance load torque approximates to an actual load torque, the actual load torque is controlled to a target value.

The disturbance estimation observer estimates a disturbance load torque based on a torque command value commanded to the motor, an actual velocity of the motor and the like. Thus, in the case where the motor is not subjected to any reactive force from the controlled system, for the reasons such that the controlled system to which a torque is to be applied is absent, or that the controlled system shifts its position when subjected to a torque, the estimated disturbance load torque will not reach the target value, thereby assumedly causing the motor to rotate excessively seeking the target value. In such a case, a value obtained by adding the product of the velocity of the motor and the predetermined coefficient to the estimated disturbance load is used, as the feedback value of the force, for the feedback control, whereby, even when the actual velocity of the motor increases, it can be controlled to correspond to the target value by increasing the feedback value. Thus the random rotation of the motor can be prevented.

Also, the value obtained by adding the product of the maximum permissible velocity of the motor and the predetermined coefficient to the estimated disturbance load torque is fed back to determine a new torque command value. The torque command value is clamped to the new torque command value to limit the velocity of motor to the maximum permissible velocity so that the rotating velocity of the motor will not exceed the maximum permissible velocity to prevent the excessive rotation of the motor.

Furthermore, the actual velocity of the motor can be fed back for preventing vibration that contributes to the improvement of control stability.

The aforesaid disturbance estimation observer estimates a disturbance load torque based on a torque command value commanded to the motor and an actual velocity thereof, and outputs the estimated torque as an estimated disturbance load torque.

BRIEF DESCRIPTION OF THE DRAWINGS

FIGS. 5(A)–(C) are views showing the relationship between a force command value and a velocity.

DESCRIPTION OF THE PREFERRED EMBODIMENT

Figure 1:
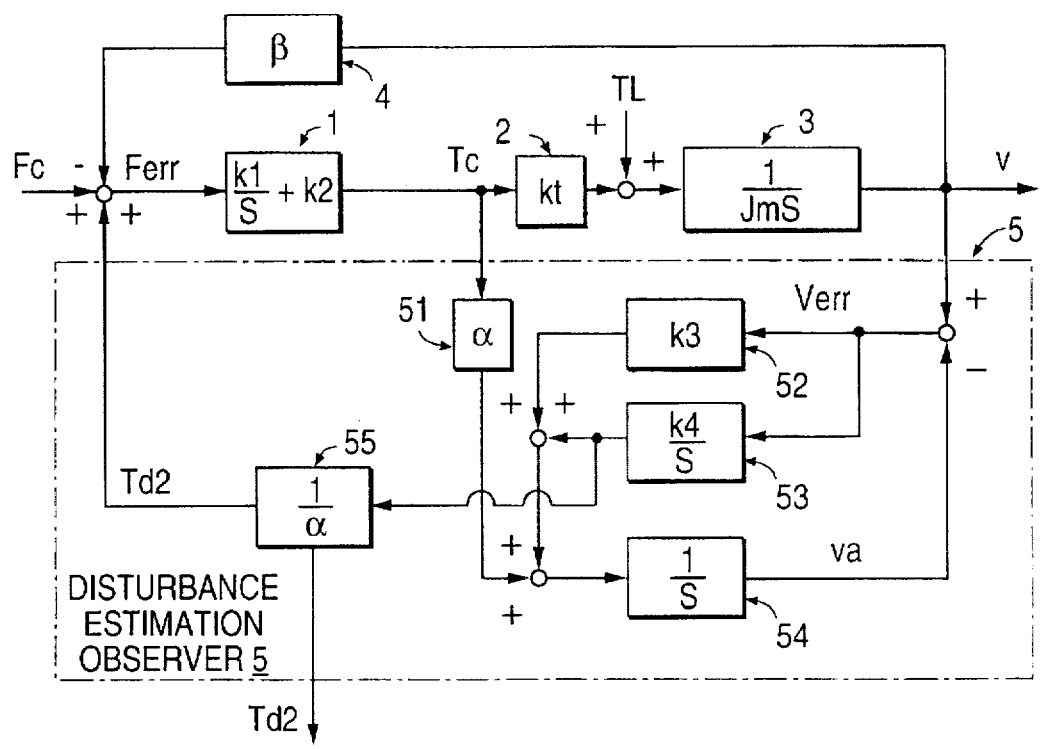
FIG. 1 is a block diagram of force control according to one embodiment to which the present invention is applied.

The block diagram shown in FIG. 1 represents one embodiment according to the present invention. FIG. 1 shows an example of force control of a servo motor for driving a feed shaft of machine tool and an axis of a robot's arm. In this embodiment, the force control is executed by proportional-plus-integral (PI) control, and force applied to the servo motor from the outside is detected by a disturbance estimation observer. In term 1, k1 is an integration constant in force feedback control, and k2 is a proportion constant. Terms 2 and 3 are transfer functions of a motor, kt being a torque constant, and Jm being inertia. Term 4 is an term for feeding back a value in which an actual velocity v of the motor is multiplied by a coefficient $\beta$.

In the block diagram of FIG. 1, disturbance estimation observer 5 corresponds to the disturbance estimation observer which detects the disturbance load torque externally applied to the servomotor and estimates the disturbance load torque Td2 based on the torque command Tc commanded to the motor and the actual velocity v of the motor. More specifically, the disturbance estimation observer 5 will not directly measure the actual disturbance load torque TL, which is externally applied to the motor, but outputs the disturbance load torque Td2 as an estimated value based on the torque command Tc and the actual velocity v of the motor. Incidentally, TL is a disturbance load torque applied actually to the motor, and S represents a Laplace operator.

Further, the disturbance load torque Td2 estimated by the disturbance estimation observer 5 is subtracted from a force command Fc. In this case, the disturbance load torque Td2 estimated by the disturbance estimation observer 5 has a reversed polarity; for this reason, in FIG. 1, the estimated disturbance load torque Td2 appears as if it is added to the force command Fc, but the estimated disturbance load torque is actually subtracted. Furthermore, a force error Ferr ($=Fc+Td2-\beta \cdot v$) is determined by subtracting the product of the actual velocity v of the motor and a coefficient $\beta$, which multiplication being executed in term 4. Based on the determined force error Ferr, proportion/integration processing is executed with respect to term 1 to determine and output a torque command (current command) Tc to the motor. A force from the servo motor (generated by a servo motor) to be applied to a controlled system is controlled according to feedback control through term 4 so that it corresponds to a force command Fc.

In the disturbance estimation observer 5, k3 and k4 in terms 52 and 53 are the parameters of the disturbance estimation observer, and $\alpha$ of a term 51 is a parameter value which is multiplied by a current value Tc, equivalent to a torque command to be outputted to the servo motor, and is obtained from an equation ($\alpha = kt^*/Jm^*$) in which an estimated value $kt^*$ of a torque constant of the motor is divided by an inertia estimated value $Jm^*$. Numeral 54 represents an integrating term that integrates a value, to which all of outputs from terms 51, 52 and 53 are added, to determine an estimated velocity va of the motor. A term 55 calculates an estimated disturbance load torque Td2 by multiplying output from the term 53 by ($1/\alpha$).

In the block diagram of force control shown in FIG. 1, assuming that $\alpha = kt^*/Jm^*$, that a torque constant kt of the motor is equal to an estimated value $kt^*$ thereof ($kt = kt^*$), and that an inertia Jm of the motor is an estimated value $Jm^*$ thereof ($Jm = Jm^*$), the following equation (1) is obtained from an operation by term 3:

$$(Tc \cdot kt + TL)(1/Jm \cdot S) = v \tag{1}$$

Further, where output va from the term 5 is taken into consideration, $$\{Tc \cdot (kt/Jm) + (v-va)k3 + (v-va)(k4/S)\} \cdot (1/S) = va \tag{2}$$

is obtained. Transforming equation (1) gives $$Tc = (v \cdot Jm \cdot S - TL)/kt \tag{3}$$

Substituting equation (3) in the above equation (2) for rearrangement, we obtain $$(v \cdot Jm \cdot S - TL)/Jm + (v-va)k3 + (v-va)(k4/S) = va \cdot S \tag{4}$$

$$S(v-va) + (v-va)k3 + (v-va)(k4/S) = TL/Jm \tag{5}$$

From equation (5), Verr ($=v-va$) can be expressed as $$Verr = v - va = (TL/Jm)[1/\{S + k3 + (k4/S)\}] \tag{6}$$

Substituting in above equation (6), the output Td1 from the term can be expressed by the following equation (7).

$$Td1 = Verr \cdot (k4/S) = (TL/Jm)\{k4/(S^2 + k3 \cdot S + k4)\} \tag{7}$$

In the above equation (7), if parameters k3 and k4 are selected so that their polarities are stabilized, the relation can be approximated by $Td1 = TL/Jm$. Thus, this relational equation indicates that the whole disturbance torque Td1 can be estimated.

Then, an estimated disturbance load torque Td2 is determined by multiplying the whole disturbance torque Td1 by $1/\alpha (= Jm^*/kt^*)$, and force feedback control is executed by using this estimated disturbance load torque Td2.

In the force feedback control using the estimated disturbance load torque Td2, a force error Ferr ($=Fc+Td2-\beta \cdot v$) with respect to a force command Fc is determined on the basis of the difference between the disturbance load torque Td2 estimated by the disturbance estimation observer 5 and the product of the actual velocity v of the motor and a coefficient $\beta$ in term 4. Further, in term 1, a torque command Tc is determined by processing the force error Ferr by proportional-plus-integral method. The torque command Tc, which is a current command, is output to the motor, thereby controlling the torque of the motor.

More specifically, force (generated by a servo motor) applied to a controlled system from the servo motor is controlled according to feedback control through term 4 so that the applied force corresponds to a force command value Fc. For instance, when the force command value Fc is provided as a predetermined value, a predetermined torque is always generated in the motor regardless of the magnitude of load applied actually to the servo motor.

Figure 2:
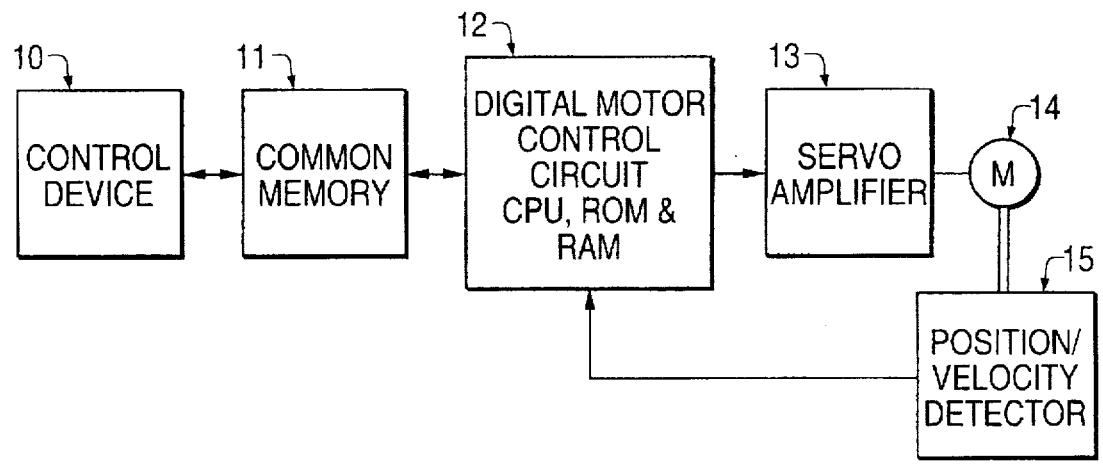
FIG. 2 is a block diagram of main parts of a servo motor control system for carrying out one embodiment to which the present invention is applied.

FIG. 2 shows a block diagram of the main parts of a servo motor control system for carrying out a method according to the present invention. In FIG. 2 reference numeral 10 denotes a control device similar to a control device for controlling machines such as an ordinary machine tool and a robot. The control device 10 outputs a move command, a force command and various control signals to a digital motor control circuit 12 through a common memory 11. The digital motor control circuit 12 comprises a processor (CPU), a ROM, a RAM and the like. Further, the control circuit 12 digitally controls the motor for position, velocity, force or the like, and also controls a servo motor 14 of each axis through a servo amplifier 13 comprising a transistor inverter or the like. A position and velocity detector 15 for detecting a position and a velocity comprises a pulse coder and the like, which are mounted on a shaft of the servo motor, and outputs feedback signals for the detected position and velocity to the digital motor control circuit 12.

The aforementioned configuration may have the same configuration as that of the conventional digital servo circuit; however, it differs from the conventional digital servo circuit in that it is capable of executing the force control.

An example of a first operation of a control system for carrying out the aforesaid force control will be explained below according to a flowchart shown in FIG. 3, which illustrates one processing of force control to be carried out by a processor of a digital motor control circuit.

In this case, the digital motor control circuit 12 is previously provided with a disturbance estimation observer comprising constants k3 and k4, and coefficients $\alpha$ and $\beta$.

Figure 3:
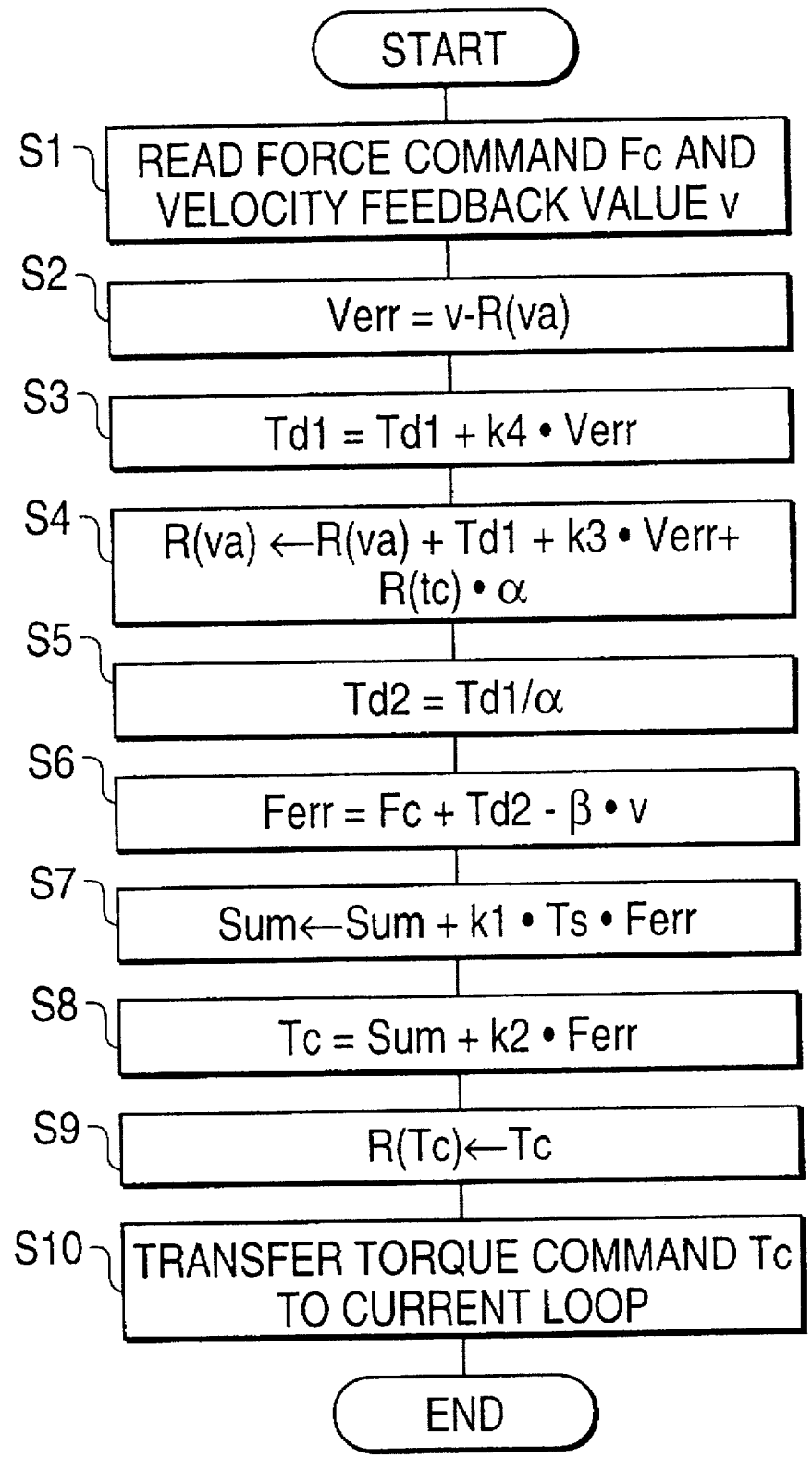
FIG. 3 is a flowchart showing one step of processing of the force control according to one embodiment to which the present invention is applied.

Also, in controlling a position and a velocity of a servo motor 14, position/velocity loop processing is executed in a conventional manner, and in carrying out force control, the force control is carried out after switching position/velocity control processing mode to force control processing mode as shown in FIG. 3. For example, when applying the force control of the present invention to a deburring robot, the robot is positioned according to the position/velocity control just before it starts a deburring operation, and thereafter, force control for the deburring operation is carried out.

When a force control processing mode is effected, the processor of the digital motor control circuit 12 executes the processing shown in FIG. 3 in every predetermined period (which is normally the same as an ordinary velocity loop processing period).

First, in step S1, the processor reads a force command value Fc, transmitted from a control device 10 through a common memory 11, and also a velocity feedback value v detected by the position/velocity detector 15.

Then, in step S2, the processing of disturbance estimation observer starts, in which the observer subtracts an estimated velocity va stored in a register R (va) from the read velocity feedback value v read in step 1, thus determining the difference Verr between the actual velocity and the estimated velocity. Incidentally, in FIG. 3, R (va) represents the estimated velocity stored in the register R.

Further, in step S3, the product of the error Verr and the constant K4 is added to the accumulator, which stores the full disturbance estimated value Td1 to obtain the full disturbance estimated value Td1 in the period concerned. In other words, this processing in step S3 is a processing of term 53 shown in FIG. 1.

In step S4, the whole disturbance estimated value Td, obtained in step S3, and the value, obtained by multiplying the difference Verr by the constant k3, are added to the register R(va), which stores the estimated velocity va. Further, the product of the torque command Tc, read in the period preceding to the period in which the storage takes place, and the set constant α(=kt*/Jm*) is added to the register R(Tc) to obtain the estimated velocity value va of the period concerned, and this estimated velocity value is stored in register R(va). In other words, this processing in step S4 is a processing for determining an estimated velocity va by terms 51, 54 and the like, as shown in FIG. 1.

Next, the estimated disturbance load torque Td2 is determined by dividing the whole disturbance estimated value Td1 determined in step S3 by a coefficient α.

The above steps S2 through S5 are the processings for determining an estimated disturbance load torque according to the disturbance estimation observer 5.

Subsequently, force control is carried out by using the estimated disturbance load torque determined by the disturbance estimation observer 5. In the following example of control, the force feedback value is determined by adding the product of the actual velocity of the motor and the set coefficient to the estimated disturbance load torque, and the force feedback value is controlled to agree with the force command value, thereby not only maintaining the stability of the operation of the motor but also preventing the excessive rotation of the motor when the reactive force from the object of control is absent.

The disturbance load torque Td2 obtained by the disturbance estimation observer 5 in the above steps S2 through S5 is used as a force feedback value, and is then subtracted from a force command value Fc. However, the disturbance load torque Td2 estimated by the disturbance estimation observer 5 has the inverse polarity to the force command value Fc, so that the estimated disturbance load torque Td2 is actually added to the force command value Fc, thereby substantially determining the difference between them.

In step S6, a value, as the product of the velocity feedback value v determined in step S1 and a coefficient α, is subtracted (from the determined disturbance load torque Td2) to determine a force error Ferr. Thus, the force error Ferr is obtained by the following equation:

$$Ferr = Fc + Td2 - \beta \cdot v$$

Subsequently, in step S7, a value, as the product of the above force error Ferr, an integral coefficient k1 and a time period Ts shown in FIG. 3, is added to an accumulator Sum, which functions as an integrator, thereby executing an integration processing. This processing corresponds to an integration processing of term 1 in FIG. 1.

In step S8, a value, as the product of the force error Ferr and a proportional constant k2, is added to the accumulator Sum to determine a torque command Tc. This step S8 corresponds to the processing of term 1 in FIG. 1.

Then, in steps S9 and S10, the torque command Tc determined in the preceding process is stored in the register R (Tc) in order to make use of the torque command in the next period, and is transferred to a current loop to end the present period.

Thereafter, the processing shown in FIG. 3 is executed in every predetermined period so long as the operation is in a force control mode.

The above embodiment employs, as a feedback value, the value obtained by adding a value, as the product of the actual velocity v of the motor and a coefficient β, to the estimated disturbance load torque Td2. The object of using the function of the actual velocity v of the motor as part of the feedback value is to improve stability by preventing vibration in the control system, and to prevent excessive rotation of the motor. The excessive rotation of the motor is caused by an extreme underestimation of the estimated disturbance load torque Td2 and resulting increase of the force error Ferr, which occur when the reaction force from the controlled system will not act on the motor due to the reason such that the object of the application of the torque is absent, or that the object of the torque moves when the torque is applied thereto. For this reason, a value proportional to the velocity of the motor is fed back, thereby preventing excessive rotation of the motor in the aforesaid situation. If reactive force from a controlled system is always applied to the motor, it is not necessary to feed back the value proportional to the velocity.

Next, an example of the second operation of the previously mentioned control system for controlling the output will be described using the flowchart of another processing of the force control to be executed by the processor of the digital control circuit for the motor shown in FIG. 4.

Figure 4:
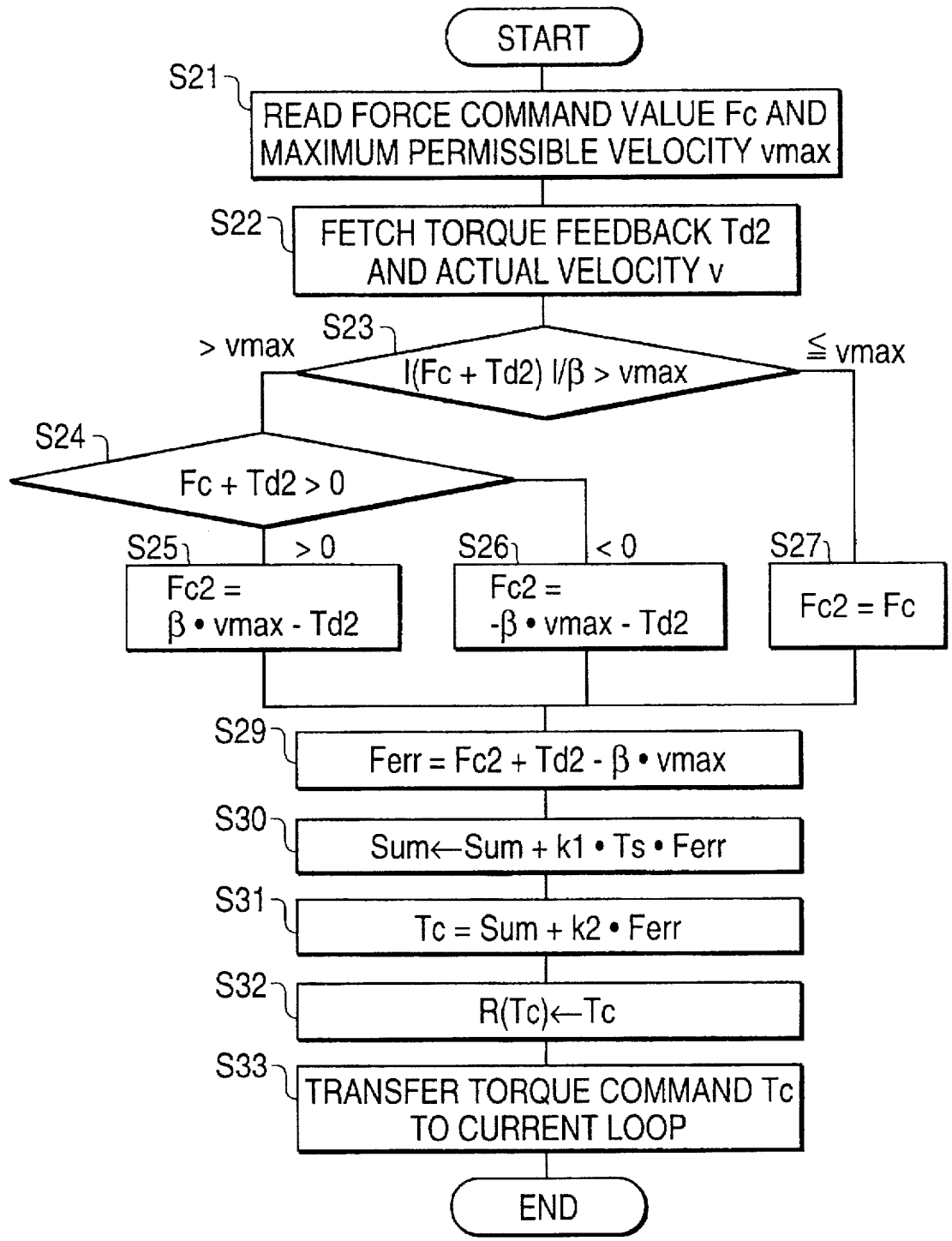
FIG. 4 is a flowchart showing another processing of the force control according to one embodiment to which the present invention is applied.

In the second operation shown in FIG. 4, the processing by the disturbance estimation observer 5 for determining an estimated disturbance load torque is the same as the processing executed in the first operation in step S1 to step S5 in FIG. 3, but differs in the control method, or in that the force control is executed using the estimated disturbance load torque determined by the estimated disturbance observer.

In the following example of control, the feedback control is executed using, as a torque command value, the value obtained by adding the estimated disturbance load torque to the product of the motor's maximum permissible velocity and the set coefficient, thereby maintaining the stability of the motor's speed and preventing the excessive rotation of the motor when the reaction force from the controlled system is absent.

In the control system shown in FIG. 1, control is executed so that a relation of $Fc = -Td2 + \beta \cdot v$ is established among a force command value Fc transmitted from the control device 10 through the common memory 11, the product of the actual velocity v detected by the position/velocity detector 15 and set coefficient β, and the estimated disturbance load torque Td2 obtained from the disturbance estimation observer 5. In other words, control is executed in order to reduce a force error Ferr (Ferr=Fc +Td2−β·v).

In the case where the estimated disturbance load torque Td2 is used as a force feedback value, the estimated disturbance load torque determined by the disturbance estimation observer 5 is subtracted from a force command value Fc; however, the disturbance load torque Td2 estimated by the disturbance estimation observer 5 has the inverse polarity to the force command value Fc, so that the estimated disturbance load torque Td2 is actually added to the force command value Fc, thereby substantially calculating the difference between them.

When the controlled system to which the torque should be applied is absent, or when the motor will not receive any reaction force from the controlled system due to that the controlled system is displaced when the torque is applied thereto, the actually generated torque falls short of the target value set by the torque command Tc. In this case, a velocity v of the motor has the relation of v=(Fc+Td2)/β. Further, the actual torque is estimated according to the disturbance load torque Td2 estimated by the disturbance estimation observer 5.

The estimated disturbance load torque Td2 is a value smaller than a target value, so that the velocity v increases in the relation of the above equation. Such an increase of the velocity v sometimes exceeds a maximum permissible velocity vmax, which is a highest velocity capable of being provided by the motor.

Thus, according to the present invention, in the case where the velocity v exceeds the maximum permissible velocity vmax, a force command value Fc2 is newly determined by adjusting the force command value Fc, and a velocity outputted by the force command value Fc2 is controlled so that it equals to the maximum permissible velocity vmax, thereby preventing the excessive rotation of the motor. In other words, in the case of v=(Fc+Td2)/β>vmax, Fc is changed into Fc2=−Td2+β·vmax, thereby causing the velocity v to be controlled so that it equals to the maximum permissible velocity vmax (in the case where a relation of Fc+Td2>0 is established).

Thus, in the second operation too, the disturbance estimation observer including the constants k3 and k4 and coefficients α and β, is previously registered in the digital motor control circuit 12, in the same manner as the aforesaid first operation. When controlling a position and a velocity of the servo motor 14, the same position/velocity loop processing as the conventional one is carried out, and when executing force control, the force control is carried out by changing over from the position/velocity control processing to a force control processing shown in FIG. 4.

When a control mode is changed over to the force control, the processor of the digital motor control circuit 12 executes the processing shown in FIG. 4 in every predetermined period. Further, the predetermined period is the same period as that of an ordinary velocity loop processing.

In step S21, the processor reads a force command value Fc and the maximum permissible velocity of the motor from the control device 10 and the common memory 11.

In step S22, the processor determines the estimated disturbance load torque Td2 which is a torque feedback value, according to the processing by the disturbance estimation observer 5 in step S1 to step S5 of the flowchart shown in FIG. 3 and fetches an actual velocity v. In FIG. 4, the processings corresponding to step S1 to step S5 by the disturbance estimation observer 5 of FIG. 3 are omitted.

In step S23, a decision is made whether or not an absolute value of (Fc+Td2)/β(=v) indicative of a velocity v exceeds the maximum permissible velocity on the bases of the force command value Fc read in step S21, the estimated disturbance load torque Td2 determined in step S22, and a coefficient β.

Referring to FIGS. 5(A)–(C) showing the relationship between a force command value and a velocity, force control is started responding to the force command value Fc, and when, for example, reactive force from a controlled system decreases at the point of time (a), the estimated disturbance load torque Td2 decreases. The decrease in the estimated disturbance load torque Td2 causes the velocity v to start being accelerated on the basis of the relation of v=(Fc+Td2), and the velocity exceeds the maximum permissible velocity vmax of the motor at the point of time(b). In step S23, a decision is made for whether or not an absolute value of (Fc+Td2)/β(=v) exceeds the maximum permissible velocity vmax.

If a decision made in step S23 is that the absolute value of (Fc+Td2)/β(=v) does not exceed the maximum permissible velocity vmax, the same force command value Fc as used conventionally is used as a new force command value Fc2 in step S27. If a decision made in step S23 is that the absolute value exceeds the maximum permissible velocity, a new force command value Fc2 is set to change the force command through the processings in step S24 to step S26.

In the case where the velocity exceeds the maximum permissible velocity, a decision is made in step S24 for whether a value of (Fc+Td2) is positive or negative. If the value of (Fc+Td2) is positive in step S25, the new force command value Fc2 is changed to (β·vmax−Td2), and the velocity is controlled so that it equals to the maximum permissible velocity vmax.

Inversely, if the value of (Fc+Td2) is negative, in step S26, the new force command value Fc2 is changed to (−β·vmax−Td2), and the velocity is controlled so that it equals to the maximum permissible velocity vmax.

In FIGS. 5(A)–(C), the force command value is changed from Fc to Fc2 at the point of time (c) corresponding to the point of time (b) when the velocity v exceeds the maximum permissible velocity. Incidentally, FIGS. 5(A)–(C) show a case where Fc2 is changed to (β·vmax−Td2).

Subsequent processings in step S29 to step S33 are the same as those in step S6 to step S10 shown in FIG. 3 in the aforesaid first operation.

More specifically, in step S29, a force error Ferr (=Fc2+ Td2−β·v) is determined by subtracting the estimated disturbance load torque Td2 and a value obtained by multiplying the maximum permissible velocity read in step S21 by a coefficient β from the force command value Fc2 determined in steps S25 to S27.

In step S30, an integrating operation is carried out by adding a value, obtained by multiplying the above force error Ferr by an integral constant k1 and a period Ts shown in FIG. 4, to the accumulator Sum to function as an integrator. This processing corresponds to the integrating operation of the term 1 in FIG. 1.

In step S31, a torque command Tc is determined by adding a value of the accumulator Sum to a value obtained by multiplying the above force error Ferr by a proportional constant k2. That is, the processing of the term 1 in FIG. 1 is carried out.

Subsequently, in steps S32 and S33, the torque command Tc determined in the preceding processing is stored in the register R (Tc) so that it is used in the next period, and is transferred to a current loop to end the processing in the present period.

In this case, for instance, when reactive force from a controlled system increases at the point of time (b) in FIGS. 5(A)–(C), the estimated disturbance load torque Td2 increases. An increase in the estimated disturbance load torque Td2 will cause the velocity v to be decelerated in the relation of v=(Fc+Td2) to become smaller than the maximum permissible velocity vmax (at the point of time (e)). Therefore, the force command value Fc2 is changed to the initial force command value Fc at the point of time (f).

After that, the aforesaid processing shown in FIG. 4 is executed in every predetermined period so long as the operation mode is for force control.

In the above examples of the first and second operations, the feedback value is determined by adding to the estimated disturbance load torque Td2 the actual velocity v of the motor or the product of the maximum permissible velocity vmax and the set coefficient β. In these examples, the function of the motor's actual velocity v is used as a part of the feedback value in order to prevent the vibration of the control system for its higher stability and also to prevent the excessive rotation of the motor when the reaction force from the controlled system is not acting on the motor. More specifically, in the case where reactive force from a controlled system is not acting on the motor, the disturbance load torque estimated by the disturbance estimation observer becomes very small; as a consequence, the force error Ferr increases and will not decrease, and this causes the motor to rotate excessively. The excessive rotation of the motor is prevented by feeding back a value proportional to a velocity, or by feeding back a value proportional to a velocity clamped to a fixed value. Therefore, in the case of a control system which is always subjected to reactive force from a controlled system, it is not necessarily required to feed back a value proportional to a velocity or a clamped velocity.

As described above, according to the present invention, a load torque acting on the motor is estimated by the disturbance estimation observer. Then, the estimated load torque is fed back so that the feedback control is effected by making the estimated load torque correspond to the commanded force, whereby not only the force control can be executed using a device which is driven through a simple sensor without requiring any force sensor or the like but also the force control device can be obtained at a low cost.

Thus, the force control using a motor as a drive source can easily be applied even to the industrial machines and the like which used to be controlled only hydraulically using hydraulic cylinders for the lack of their adaptabilities to the force control.

What is claimed is:

1. A force control method based on a disturbance load estimation comprising the steps of:

estimating an external load acting on a controlled system driven by a motor by a disturbance estimation observer and outputting an estimated disturbance load torque based thereon;

feeding back said estimated disturbance load torque; and carrying out feedback control so that said estimated disturbance load torque corresponds to a commanded force value, wherein a value obtained by adding a product of a velocity of the motor and a coefficient to said estimated disturbance load torque determines a force feedback value.

2. A force control method based on a disturbance load estimation according to claim 1, wherein said disturbance estimation observer estimates a disturbance load torque based on a torque value commanded to the motor and an actual velocity of the motor.

3. A force control method based on a disturbance load estimation, comprising the steps of:

estimating an external load acting on a controlled system driven by a motor by a disturbance estimation observer and outputting an estimated disturbance load torque based thereon;

feeding back said estimated disturbance load torque; and carrying out feedback control so that said estimated disturbance load torque corresponds to a commanded force value, wherein a force feedback value is clamped according to a value obtained by adding a product of a maximum permissible velocity of the motor and a coefficient to said estimated disturbance load torque, thereby controlling a rotational velocity of the motor so that the rotational velocity of the motor is less than the maximum permissible velocity.

4. A force control method based on a disturbance load estimation according to claim 3, wherein said disturbance estimation observer estimates a disturbance load torque based on a torque value commanded to the motor and an actual velocity of the motor.

* * * * *